United States Patent [19]

Tsuno et al.

[11] Patent Number: 5,109,057
[45] Date of Patent: Apr. 28, 1992

[54] PRIMER COMPOSITION

[75] Inventors: Shingo Tsuno, Sakai; Masahiro Ito, Mishima, both of Japan

[73] Assignee: Sunstar Giken Kabushiki Kaisha, Osaka, Japan

[21] Appl. No.: 550,674

[22] Filed: Jul. 10, 1990

Related U.S. Application Data

[63] Continuation-in-part of Ser. No. 441,644, Nov. 27, 1989, abandoned.

[30] Foreign Application Priority Data

Nov. 28, 1988 [JP] Japan ............................. 63-302016

[51] Int. Cl.⁵ .............................................. C08L 83/00
[52] U.S. Cl. .................................... 524/588; 524/114; 524/188; 524/262; 524/590
[58] Field of Search ............... 524/588, 590, 261, 114, 524/188, 262, 588, 590; 528/28

[56] References Cited

U.S. PATENT DOCUMENTS

| | | | |
|---|---|---|---|
| 3,886,226 | 5/1975 | Asai et al. | 528/28 |
| 4,542,065 | 9/1985 | Gaa | 524/588 |
| 4,628,076 | 12/1986 | Chamg et al. | 525/440 |
| 4,645,816 | 2/1987 | Pohl et al. | 528/28 |
| 4,839,455 | 6/1989 | Fong | 528/28 |
| 4,857,623 | 8/1989 | Emmerling et al. | 528/28 |

*Primary Examiner*—Joseph L. Schofer
*Assistant Examiner*—R. H. Delmendo
*Attorney, Agent, or Firm*—Wegner, Cantor, Mueller & Player

[57] ABSTRACT

Primer composition comprising a silane coupling agent, an alkoxysilylated NCO-containing urethane prepolymer which is prepared by reacting a polyisocyanate with a diol to give an NCO-containing urethane prepolymer, and reacting the resulting NCO-containing urethane prepolymer with a trialkoxysilane having a functional group active to NCO group wherein a part of whole of the remaining NCO groups of the high molecular weight polyisocyanate are reacted with the silane. Said primer composition has excellent plasticizer resistance, solvent resistance and film-forming properties and further improved adhesin properties to glass, metals, ceramics, and is useful as a primer for various adhesives, particularly for applying to glass, metals, and ceramics.

11 Claims, No Drawings

PRIMER COMPOSITION

This application is a Continuation-in-Part application of U.S. Ser. No. 441,644 filed on Nov. 27, 1989, now abandoned.

This invention relates to a primer composition, more particularly, to a primer composition comprising a specific alkoxysilyl compound as the main component which has excellent resistance to plasticizers, solvent resistance and film-forming properties and further has improved adhesion properties to glass, metals, ceramics, etc., and is useful as a primer for various adhesives.

Prior Art

As a primer for adhesives useful for glass, metals, ceramics, there is known a primer composition comprising a silane coupling agent selected from silane compounds such as aminosilanes, epoxysilanes, mercaptosilanes, etc. or a reaction product of an epoxysilane and other silane compound; an alkoxysilylated compound prepared by reacting a polyisocyanate and a silane having a functional group reactive with NCO; and a film-forming agent, which has excellent stability and excellent workability (cf. Japanese Patent Second Publication (Kokoku) No. 33318/1982). However, when the alkoxysilylated compound of a polyisocyanate as mentioned above is used, the primer composition has generally the following defects.

(1) After being treated with the primer composition, the film formed with the primer composition is swollen or softened with the plasticizers and/or solvents contained in the adhesives to be applied thereon, and thereby, the adhesion between the film of the primer and the substance to be adhered is decreased.

(2) The film of the primer is formed by curing of the primer composition due to the condensation reaction of the silane compound and the forming of the film takes much time, and hence, the drying of the film (dryness in touch with finger) requires much longer period of time.

BRIEF DESCRIPTION OF THE INVENTION

The present inventors have intensively studied as to an improved primer composition having no drawbacks as mentioned above, and have found that when an alkoxysilylated compound prepared by reacting a polyisocyanate with a diol and alkoxysilylating the resulting NCO-containing urethane prepolymer (high molecular weight polyisocyanate) is used instead of the alkoxysilylated polyisocyanate as used in the known primer composition, any film-forming agent is no more necessary and further the formed film of the primer shows significantly low solubility to the plasticizer and/or solvent and hence is not swollen or softened, which results in shortening of the drying time (dryness in touch with finger). That is, the primer composition has excellent plasticizer resistance, solvent resistance and hence shows improved adhesion between the primer film and the substance to be adhered and improved weatherability, water resistance, moisture resistance. Moreover, since it has excellent film-forming properties, when the primer composition is applied to the substance to be adhered, tackiness of the film is significantly decreased even immediately after application thereof.

An object of this invention is to provide an improved primer composition which has excellent plasticizer resistance, solvent resistance and film-forming properties and is useful for improving the adhesion properties to glass, metals, ceramics, etc. Another object of the invention is to provide a primer composition containing a specific alkoxysilylated polyisocyanate (i.e. an alkoxysilylated NCO-containing urethane prepolymer) which can show excellent film-forming properties without necessity of use of a film-forming agent. These and other objects and advantages of the invention will be apparent to those skilled in the art from the following description.

DETAILED DESCRIPTION OF THE INVENTION

The primer composition of this invention comprises a silane coupling agent and an alkoxysilylated NCO-containing urethane prepolymer which is prepared by reacting a polyisocyanate with a diol to give an NCO-containing urethane prepolymer, followed by reacting with a trialkoxysilane having a functional group active to NCO group wherein a part or whole of the remaining NCO groups of the NCO-containing urethane prepolymer are reacted with the silane.

The silane coupling agent used in this invention includes epoxysilanes [e.g. γ-glycidoxypropyltrimethoxysilane, γ-glycidoxypropylmethyldimethoxysilane, 3,4-epoxycyclohexylethyltrimethoxysilane, 3,4-epoxycyclohexylethylmethyldimethoxysilane, etc.], aminosilanes [e.g. aminomethyltriethoxysilane, N-(β-aminoethyl)aminomethyl-trimethoxysilane, aminomethyldiethoxysilane, N-(β-aminoethyl)methyltributoxysilane, γ-aminopropyltriethoxysilane, γ-aminopropylmethyldiethoxysilane, γ-aminoisobutyltrimethoxysilane, N-bis(β-hydroxyethyl)-γ-aminopropyltriethoxysilane, N-(β-aminoethyl)-γ-aminopropyltrimethoxysilane, N-(β-aminoethyl)-γ-aminopropylmethyldimethoxysilane, N-(β-aminoethyl)-γ-amino-β-methylpropyltrimethoxysilane, etc.], mercaptosilanes [e.g. γ-mercaptopropylmethyldimethoxysilane, γ-mercaptopropyltrimethoxysilane, γ-mercaptopropylmethyldiethoxysilane, γ-mercaptopropyltriethoxysilane, γ-mercaptopropylethyldimethoxysilane, γ-mercaptopropylethyldiethoxysilane, β-mercaptopropyldimethylmethoxysilane, β-mercaptoethylmethyldimethoxysilane, β-mercaptoethyltriethoxysilane, etc.], and modified silanes which are prepared by reacting 1 mole of the above epoxysilane with 0.1 to 1 mole of the above aminosilane or mercaptosilane having a functional group active to epoxy group (e.g. hydroxyl group, amino group, imino group, or mercapto group).

The alkoxysilylated NCO-containing urethane prepolymer can be prepared by reacting a polyisocyanate with a diol in an appropriate organic solvent (preferably a solvent as used in the preparation of a primer composition as mentioned hereinafter) wherein the reaction proceeds in a ratio of NCO/OH=2-3, followed by reacting with a trialkoxysilane having a functional group active to NCO group such as hydroxyl group, amino group, imino group, mercapto group, wherein a part or whole of the NCO groups remained in the polyisocyanate thus reacted is reacted with the NCO-reactive silane. It is assumed that the alkoxysilylated NCO-containing urethane prepolymer will be a mixture of dimers, trimers and pentamers, but the mixture can be used as it stands without isolating. It is preferable that less than 30%, more preferably less than 10%, of the NCO groups of the polyisocyanate are remained in the free form in the final alkoxysilylated compound. The above reaction proceeds in two stages, but the reaction can be carried out in a single vessel by adding the diol and the NCO-reactive silane to a polyisocyanate.

The polyisocyanate used in the above reaction includes aliphatic, alicyclic or aromatic polyisocyanates, and further hydrogenated products of these polyisocyanates, and adducts thereof. Preferred examples of the polyisocyanate are hydrogenated xylylenediisocyanate, trimethylolpropane adduct of hydrogenated xylylenediisocyanate, hydrogenated diphenylmethanediisocyanate, hexamethylenediisocyanate, isophoronediisocyanate adduct of hexamethylenediisocyanate (a commercial product, Duranate W3330-75E, manufactured by Asahi Chemical Industry Co., Ltd.), trimethylhexamethylenediisocyanate, tolylenediisocyanate adduct of hexamethylenediisocyanate (a commercial product, Desmodur HL, manufactured by Bayer A.G.), tolylenediisocyanate adduct (a commercial product, Sumidur IL, manufactured by Sumitomo Bayer Urethane K.K.).

The diol used above is glycols having a straight chain of 2 to 6 carbon atoms [e.g. ethylene glycol (molecular weight: 62, OH number: 1810), 1,4-butanediol (molecular weight: 90, OH number: 1247), 1,6-hexanediol (molecualr weight: 118, OH number: 1122), etc.], and compounds having a $C_1$-$C_4$ alkyl side chain on the above glycols [e.g. 2,2,4-trimethyl-1,3-pentanediol (molecular weight: 146, OH number: 768), 2-ethyl-1,3-hexanediol (molecular weight: 146, OH number: 768), 2,2-diethyl-1,3-propanediol (molecular weight: 132, OH number: 850), 2-n-butyl-2-ethyl-1,3-propanediol (molecular weight: 159, OH number: 706), etc.]. The OH number is calculated by the following equation:

$$\text{OH number} = \frac{56.1 \times 1000 \times f}{M.W.}$$

wherein f is average number of hydroxy groups per molecule of the diol, and M. W. is average molecular weight of the diol.

The glycols having a straight chain of 7 or more carbon atoms are expensive and further tend disadvantageously to induce increased viscosity of the primer composition and hence is not preferable in view of less workability. Preferred diols have a molecular weight of not more than 150 and the OH number of more than 700, more preferably more than 1000, because when the diols have a higher molecular weight, the final composition shows inferior film-forming properties (that is, gives merely soft film but can not give hard film), and further when the diols have a lower OH number, for example less than 700, the final composition shows too high viscosity and can not applied to smoothly, and further the diols having lower OH number have lower alkoxysilyl content which gives disadvantageously a final composition having less adhesion, and moreover, the final composition becomes soft like a sealing composition and hence can not be used as a primer. Thus, the preferred diols are glycols having a straight chain of 2 to 6 carbon atoms as mentioned above.

The trialkoxysilane used in the above reaction includes, for example, aminotrialkoxysilanes such as aminomethyltriethoxysilane, N-(β-aminoethyl)aminomethyltrimethoxysilane, N-(β-aminoethyl)methyltributoxysilane, γ-aminopropyltriethoxysilane, N-bis(β-hydroxyethyl)-γ-aminopropyltriethoxysilane, N-(γ-aminoethyl)-β-amino-β-methylpropyltrimethoxysilane, etc., and mercaptotrialkoxysilanes such as γ-mercaptopropyltrimethoxysilane, β-mercaptopropyltriethoxysilane, γ-mercaptoethyltrimethoxysilane, β-mercaptoethyltriethoxysilane, etc.

The primer composition of this invention is prepared by dissolving the above silane coupling agent and the alkoxysilylated NCO-containing urethane prepolymer in a ratio of 1/50 to 5/1 by weight in an appropriate organic solvent, such as ketones (e.g. methyl ethyl ketone, acetone, etc.), esters (e.g. ethyl acetate, butyl acetate, etc.), ethers (e.g. diethyl ether, tetrahydrofuran, dioxane, etc.), aromatic hydrocarbons (e.g. toluene, xylene, benzene, etc.), and the like. The solvent is contained in an amount of 10 to 90 parts by weight, preferably 30 to 60 parts by weight, based on the whole weight of the composition. When the primer composition is used for applying to glass, the composition may also be incorporated with carbon black (preferably acidic carbon black having pH 2.5-4 because of its extremely high weatherability), inorganic pigments, organic dyes, ultraviolet absorbers, and the like in order to prevent effectively from ultraviolet. The primer composition may also be incorporated with thickening agents, dehydrating agents, plasticizers, and the like.

This invention is illustrated by the following Examples, but should not be construed to be limited thereto.

EXAMPLE 1

Trimethylolpropane adduct of hydrogenated xylylenediisocyanate (Takenate D-120N, manufactured by Takeda Chemical Industries, Ltd.) (27 g) is dissolved with stirring in methyl ethyl ketone (MEK) (60 g) under $N_2$ gas, and thereto are added 1,4-butanediol (1 g) and γ-mercaptopropyltrimethoxysilane (KBM-803, manufactured by Shin-Etsu Chemical Co., Ltd.) (9 g), and the mixture is reacted with stirring at room temperature for 10 minutes and further under refluxing of MEK (at about 60° C.) for 24 hours to give an alkoxysilylated NCO-containing urethane prepolymer.

To the alkoxysilylated NCO-containing urethane prepolymer (30 g) are added as a silane coupling agent a reaction product (3 g) of N-(β-aminoethyl)-γ-aminopropyltrimethoxysilane (KBM-603, manufactured by Shin-Etsu Chemical Co., Ltd.) and γ-glycidoxypropyltrimethoxysilane (KBM-403, manufactured by Shin-Etsu Chemical Co., Ltd.), carbon black (6 g) and MEK (11 g), and the mixture is dispersed with a ball mill to give a primer composition.

The primer composition was applied to a glass plate and immediately a plasticizer [i.e. di(2-ethylhexyl) phthalate] or a solvent (toluene) was added thereto, but the film of the primer was not dissolved.

Test of film forming property

The primer composition prepared in the above (1) was applied to a glass plate in a thickness of 5-10 μm and allowed to stand at 20° C., 65% relative humidity (RH), and the time till being dried (dryness in touch with finger) was measured. The result is shown in Table 1 together with the result in Reference Example.

Test of weatherability

The above primer composition was applied to a glass plate and allowed to stand at room temperature for 5 minutes, and thereto was applied a urethane sealant (Penguinseal #551, manufactured by Sunstar Giken K.K.), and the resultant was allowed to stand at room temperature for 5 days to cure the composition. The resultant glass plate was irradiated with a sunshine weatherometer for 2,000 or 4,000 hours, and thereafter, subjected to a test for adhesion by a knife-cut peeling test at 180°. The result is shown in Table 1 together with the result in Reference Example, wherein "CF" means cohesive failure of the sealant, and "AF" means interfacial failure between the glass and the primer film.

TABLE 1

|  | Example 1 | Reference Example* |
|---|---|---|
| Film-forming property | less than 5 minutes | 50-60 minutes |
| Weatherability |  |  |
| for 2,000 hours | CF | AF |
| for 4,000 hours | CF | AF |

*In Reference Example, there was used a primer composition prepared as follows: In the same manner as described in Example 1, an alkoxysilylated NCO-containing urethane prepolymer (30 g) prepared by reacting a polyisocyanate (Takenate D-120N) with a mercaptosilane (KBM-803) is mixed with a reaction product (3 g) of an aminosilane (KBM-603) and an epoxysilane (KBN-403), carbon black (6 g). MEK (11 g) and an acrylic resin (5 g), and the mixture is dispersed with a ball mill for 24 hours to give a primer composition.

In the same manner as described in Example 1, an alkoxysilylated NCO-containing urethane prepolymer (30 g) prepared by reacting a polyisocyanate (Takenate D-120N) with a mercaptosilane (KBM-803) is mixed with a reaction product (3 g) of an aminosilane (KBM-603) and an epoxysilane (KBN-403), carbon black (6 g), MEK (11 g) and an acrylic resin (5 g), and the mixture is dispersed with a ball mill for 24 hours to give a primer composition.

EXAMPLE 2

Tolylenediisocyanate adduct (Sumidur IL, manufactured by Sumitomo Bayer Urethane K.K.) (30 g) is dissolved with stirring in MEK (60 g) under $N_2$ gas, and thereto are added 50% (w/w) solution (4 g) of 2,2,4-trimethyl-1,3-pentanediol (CS-8, manufactured by Chisso Petroleum Co., Ltd.) in MEK and γ-mercaptopropyltrimethoxysilane (KBM-803) (10 g), and the mixture is reacted with stirring at room temperature for 10 minutes and further under refluxing of MEK for 24 hours to give an alkoxysilylated compound of a high molecular weight polyisocyanate.

To the alkoxysilylated NCO-containing urethane prepolymer thus obtained (20 g) are added γ-glycidoxypropyltrimethoxysilane (KBM-403) (2 g) and MEK (18 g), and the mixture is stirred for 1 hour to give a primer composition.

The primer composition was subjected to the tests of plasticizer resistance and solvent resistance like in Example 1, but the primer film was not dissolved.

Test of moisture resistance

The above primer composition was applied to a stainless steel plate and allowed to stand at room temperature for 5 minutes, and thereto was applied a urethane sealant (Penguinseal #551), and the resultant was allowed to stand at room temperature for 5 days to cure the composition. The resultant plate was kept at 50° C., 90% RH for 30 or 60 days, and thereafter, subjected to a test for adhesion by a knife-cut peeling test at 180° like in Example 1. The result is shown in Table 2 together with the result in Reference Example (the same as in Example 1).

TABLE 2

| Mositure resistance: | Example 2 | Reference Example |
|---|---|---|
| for 30 days | CF | 5% AF |
| for 60 days | CF | 50% AF |

What is claimed is:
1. A primer composition comprising:
(a) a silane coupling agent selected from the group consisting of epoxysilanes, mercaptosilanes and modified silanes prepared by reacting 1 mole of an epoxysilane and 0.1 to 1 mole of an aminosilane or a mercaptosilane;
(b) an alkoxysilylated NCO-containing prepolymer which is prepared by reacting (i) a polyisocyanate with (ii) a diol having a molecular weight of not more than 150 in an organic solvent to obtain an NCO-containing urethane prepolymer, wherein a ratio of NCO/OH of said polyisocyanante and said diol is 2 to 3 and said diol is selected from the group consisting of a glycol having a straight chain of 2 to 6 carbon atoms and a glycol having a straight chain of 2 to 6 carbon atoms and a $C_1$-$C_4$ alkyl side chain thereon, and reacting the NCO-containing urethane prepolymer with (iii) and NCO-reactive trialkoxysilane having a functional group reactive with an NCO group in the same organic solvent, wherein at least a portion of unreacted NCO groups of the NCO-containing urethane prepolymer are reacted with the NCO-reactive trialkoxysilane; and
(c) an organic solvent.
2. The primer composition according to claim 1, wherein the diol is a glycol having a straight chain of 2 to 6 carbon atoms.
3. The primer composition according to claim 2, wherein the diol is a member selected from the group consisting of ethylene glycol, 1,4-butanediol and 1,6-hexanediol.
4. The primer composition according to claim 1, wherein the trialkoxysilane is a member selected from the group consisting of an aminotrialkoxysilane and a mercaptotrialkoxysilane.
5. The primer composition according to claim 1, wherein the silane coupling agent and the alkoxysilylated NCO-containing urethane prepolymer are incorporated in a ratio of 1/50 to 5/1 by weight.
6. The primer composition according to claim 1, wherein the diol has an OH value of more than 700.
7. The primer composition according to claim 6, wherein the diol has an OH value of more than 1000.
8. The primer composition according to claim 1, wherein less than 30% of the NCO groups in the polyisocyanate remain after reaction with the diol in forming the NCO-containing urethane prepolymer.
9. The primer composition according to claim 8, wherein less than 10% of the NCO groups in the polyisocyanate remain after reaction with the diol in forming the NCO-containing urethane prepolymer.
10. The primer composition according to claim 1, wherein the glycol is a glycol having a straight chain of 2 to 6 carbon atoms and a $C_1$-$C_4$ alkyl side chain thereon.
11. The primer composition according to claim 10, wherein the glycol is selected from the group consisting of 2,2,4-trimethyl-1,3-pentanediol, 2-ethyl-1,3-hexanediol, 2,2-diethyl-1,3-propanediol and 2-n-butyl-2-ethyl-1,3-propanediol.

* * * * *